(12) United States Patent
Bastide et al.

(10) Patent No.: US 10,552,381 B2
(45) Date of Patent: Feb. 4, 2020

(54) SHARED DOCUMENT EDITING IN THE BLOCKCHAIN

(71) Applicant: International Business Machines Corporation, Armonk, NY (US)

(72) Inventors: Paul R. Bastide, Boxford, MA (US); Jonathan Dunne, Waterford (IE); Liam Harpur, Dublin (IE); Robert E. Loredo, Miami, FL (US)

(73) Assignee: International Business Machines Corporation, Armonk, NY (US)

(*) Notice: Subject to any disclaimer, the term of this patent is extended or adjusted under 35 U.S.C. 154(b) by 336 days.

(21) Appl. No.: 15/381,692

(22) Filed: Dec. 16, 2016

(65) Prior Publication Data

US 2018/0173719 A1    Jun. 21, 2018

(51) Int. Cl.
| | | |
|---|---|---|
| *G06F 16/176* | (2019.01) | |
| *G06F 17/24* | (2006.01) | |
| *G06F 16/13* | (2019.01) | |
| *G06F 21/62* | (2013.01) | |
| *G06F 21/64* | (2013.01) | |

(52) U.S. Cl.
CPC .......... *G06F 16/176* (2019.01); *G06F 16/13* (2019.01); *G06F 17/24* (2013.01)

(58) Field of Classification Search
CPC ........ G06F 16/176; G06F 16/13; G06F 17/24; G06F 21/6209; G06F 21/64

USPC ........................................................ 707/609
See application file for complete search history.

(56) References Cited

U.S. PATENT DOCUMENTS

| | | |
|---|---|---|
| 2015/0332283 A1 | 11/2015 | Witchey |
| 2016/0027229 A1 | 1/2016 | Spanos et al. |
| 2016/0212146 A1 | 7/2016 | Wilson |
| 2017/0048216 A1* | 2/2017 | Chow ................ G06Q 20/0655 |
| 2017/0103472 A1 | 4/2017 | Shah |
| 2017/0220815 A1 | 8/2017 | Ansari et al. |
| 2017/0237569 A1* | 8/2017 | Vandervort ........... H04L 9/3247 713/171 |
| 2017/0243193 A1 | 8/2017 | Manian et al. |

OTHER PUBLICATIONS

David S. Gerstl, Leveraging bitcoin blockchain technology to modernize security perfection under the uniform commercial code,Chapter—Software Business, vol. 240 of the series Lecture Notes in Business Information rocessing pp. 109-123, Springer, Abstract.

* cited by examiner

*Primary Examiner* — Evan Aspinwall

(57) ABSTRACT

A blockchain of transactions may be referenced for various purposes and may be later accessed by interested parties for ledger verification. One example operation may comprise one or more of identifying determining a shared file is being edited by one or more entities, identifying one or more changes to the shared file while the shared file is being edited, signing the one or more changes with one or more public keys, and adding the one or more changes to a blockchain.

17 Claims, 5 Drawing Sheets

350

SHARED DOCUMENT EDITING IN THE BLOCKCHAIN

TECHNICAL FIELD

This application relates to storing transaction in a shared environment, and more particularly, to sharing document editing in the blockchain.

BACKGROUND

The blockchain has proven useful for financial transactions and similar types of transactions between various participants. Blockchains are append-only databases of transactions, which are shared and replicated with a consensus algorithm to resolve distributed processing conflicts and prove the validity of the transactions. Each transaction signs and builds on the prior transaction to form an accurate accounting of ownership and value. Each approved transaction becomes part of the chain and is shared among multiple entities, such as enterprise organizations. A ledger model can be quickly adapted for other purposes related to tracking and monitoring user activities, especially, high transaction volume systems. These adaptations may undergo interchange settlement lag, pegged currency of transactions and high-speed negotiations.

Sidechains were developed to address issues with interchange settlement lag, pegged currency of transactions and high-speed negotiation. These secondary chains quickly clear transactions and speed the proof-of-work process. While these secondary chains speed transactions, the overall validation chain could still be further optimized in real-time transactions.

SUMMARY

One example embodiment may include a method that comprises one or more of determining a shared file is being edited by one or more entities, identifying one or more changes to the shared file while the shared file is being edited, signing the one or more changes with one or more public keys, and adding the one or more changes to a blockchain.

Another example embodiment may include an apparatus that includes a processor configured to perform one or more of determine a shared file is being edited by one or more entities, identify one or more changes to the shared file while the shared file is being edited, sign the one or more changes with one or more public keys, and add the one or more changes to a blockchain.

Still another example embodiment may include a non-transitory computer readable medium with instructions that when executed cause a processor to perform one or more of determining a shared file is being edited by one or more entities, identifying one or more changes to the shared file while the shared file is being edited, signing the one or more changes with one or more public keys, and adding the one or more changes to a blockchain.

DETAILED DESCRIPTION

Figure 1:
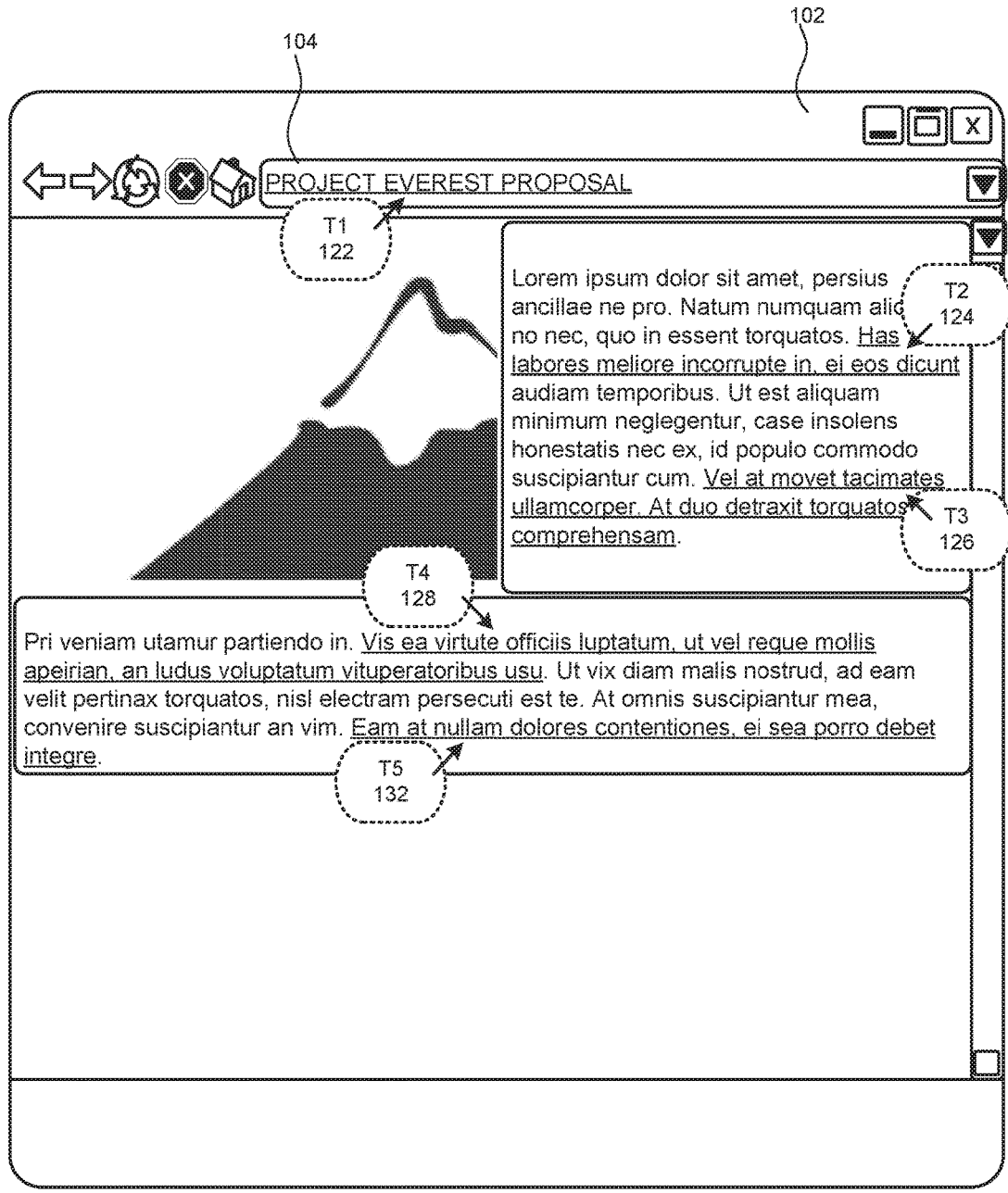
FIG. 1 illustrates a shared document editing example according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide blockchain transaction validation in real-time for document editing. Examples include, managing versions of a document based on the complexity of the blockchain validation, adding a new document to the document editing software, sharing the document between multiple parties, monitoring changes/transactions to the document, adding each of the transactions to a blockchain or sidechain, monitoring the complexity of validation for the blockchain, versioning the document and creating a new blockchain when the complexity exceeds a set threshold base on time, cycles, memory, etc.

In one example, a user 'A' shares a file with a customer 'B' and colleague 'C'. The file is being edited simultaneously and contains privileged information. A genesis block is created using a cryptographic hash using the initial document as input. 'B' updates the file in a privileged section: T1(1)-A, T1(2)-confidential. The application then signs the delta change with 'A' and 'B''s public keys and sends the T1 delta to their sharing systems. 'B' updates the file in a non-privileged section: T2(1)-DELETE(X). The application signs the delta change T2 with 'A' and 'C''s public keys and sends the T2 delta to their sharing systems. The application uses extra time evaluating all the real-time transactions to reduce the time for blockchain transaction validations. 'T' is the prefix of a transaction, '#' is the number of the transaction, 'A' is the first transaction's first contents, confidential is the first transaction's second contents, and 'T2(1)' is the first content which is a delete of content 'X', and where 'X' could have been, in this example, the word 'paper' or the word 'yogurt'.

The application utilizes and manages versions of a document based on the complexity of the blockchain validation. For example, the process may include adding a new document to the document editing software [DOC1], sharing the document [DOC1] between multiple parties [A, B, E], monitoring changes/transactions to the document [DOC1], adding each of the transactions to a blockchain (or sidechain) [B1], monitoring the complexity of the validations for the blockchain [B1], and when the complexity exceeds a set threshold based on time for validation and/or computing resources, creating a new version of the document [DOC1>DOC1(1)] and creating a new blockchain [B1(1)].

Another approach to reducing document complexity and validation time is to assign document regions which may be "edit heavy", having many edits in a particular page or page portion, with their own side chain or version in the blockchain. Document regions can be spatially aware sidechains that dynamically create additional sidechains within the document so that congestion in one region does not impact edits in other regions. The system maintains and adds a timing component within the blockchain, such that the "mining" to validate a change includes checking a threshold "human user time to complete" in, for example, seconds. For example, a particular paragraph of a document could have the following aggregate statistics: paragraph ID: 341*b*, average time to review: 16 seconds, average time to read: 9 seconds. With the above information, when user 'A' submits a change in paragraph ID 341*b*, in certain circumstances, subsequent processing may be short circuited on the other nodes such that the paragraph is accepted. A blockchain will have the timing input, and a sidechain may be created for another transaction. The validation time determines when a new genesis block is created or a new blockchain is created. When the validation time exceeds a threshold, a new document version is created. A new version may be smaller and/or faster because it has none of the previous edits.

In another example 'A' shares a file with a customer 'B' and colleague 'C'. The application detects that a new document is added to the document editing software, and shared between multiple parties. The application calculates the genesis block using a cryptographic hash using the initial document as input. The document/file may be edited simultaneously by more than one participant and may contain privileged information. 'B' updates the file in a privileged section [T1(1)-A, T1(2)-confidential]. The transaction is added to the blockchain B1. The application signs the delta change with 'A' and 'C''s public keys and sends the T1 delta to their sharing systems. 'B' updates the file in a non-privileged section [T2(1)–DELETE (X)]. The application signs the delta change T2 with 'A' and 'C''s public keys and sends the T2 delta to their sharing systems. The application adds the transaction to the blockchain B1, which validates the transaction and determines the blockchain takes X amount of time to validate (i.e., 10 seconds). The application compares the 10 second value to a threshold (i.e., 5 seconds). The application calculates the new genesis block using a cryptographic hash and using the new document as input for the computation. The application creates a new version 'V2' of the document. This scenario may be further expanded to demonstrate the value of keeping a short blockchain so the cryptographic functions are performed at an optimal rate. A genesis block is the first block of a blockchain. Often the genesis block is hardcoded, in this case it could be a cryptographic hash of the document for validating the document 'as-is' and permitting verification prior to analysis.

In another example, the new document may be a new document to the document editing software [DOC1]. In this example, the document is shared between multiple parties [A, B, E]. The application can operate with a real-time word processing editor. A new file is detected and created. The file creation may be detected via a user interface hook or event notification, which indicates that a new file is created. The application subsequently sets up blockchain partnerships with the parties that are jointly editing the file. The blockchains may be remote or localized to the system. When monitoring changes/transactions to the document [DOC1], for each new change to the document, the application captures a transaction and persists the transaction to the distributed and auditable ledger, such as the transactions and changes to an example document as illustrated in FIG. 1

Referring to FIG. 1, a shared document editing example is illustrated according to example embodiments. Transactions may be based on the user's pause within an editing session (i.e., stop typing, navigate versus type, etc.), and/or a user context change. Adding each of the transactions to a blockchain (or sidechain) [B1] for each of the transactions, the application adds each of the transactions to the blockchain as they are identified. The application may keep an audit log going when there are a high number of transactions on a particular resource in an effort to minimize or delay potential inappropriate activity. The application may use shadowed/anticipated transactions. The application may present the ordering as a graph with actual transactions as one color, unexpected transactions as another color, expected but unrealized transactions as still another color. The application dynamically detects and reacts to temporal changes to graph model representations of the transactions such as time lag based on certain behaviors of nodes at a given time (T6) as processing faster based on a color, or better quality of results as (T7) another color. The application may compare complexity of the transactions after a quiescence of transactions in files. Additionally, a change in content may be a transaction, which is logged into the blockchain. A context change may also be an event that triggers a blockchain log transaction, however, such an event is not as elevated in priority as the content change which is more likely to trigger a specific transaction.

FIG. 1 includes a document interface 100 with a document title 104 which was recently edited at T1-122, the document interface may include a menu bar 102 as found in any document interface. Other edits T2-124, T3-126, T4-128 and T5-132 may be performed in the order they are labeled and may include highlights or other indicators in the document, such as 'track changes' to illustrate the author and/or substance of the transactions. Monitoring the complexity of the validation for the blockchain [B1], the application validates the transaction ledger and records the time taken to validate the blockchain. The complexity of the validation may have a minimum time before a chain is evaluated with a threshold time (e.g., 30 seconds, 30 minutes, 8 hours, 12 hours, 24 hours, 1 week). When the complexity exceeds a set threshold, versioning the document [DOC1>DOC1(1)] and creating a new blockchain based on the new document B1(1). Based on the total time taken to validate, the application may create new versions of the document and create a new genesis in the blockchain based on the new document.

The application may manage drafts, co-edits, contracts and versioning based on blockchain complexity. The application may create versions based on time, complexity of cryptographic validation and/or the number of transactions. The application may split or use a consensus to validate the version. Branches may expire, which are built based on the split. Document regions which have multiple edits would have their own "version" in a blockchain as a way to manage those edits in real time. For instance, the title page may have infrequent edits but the introduction and conclusion may undergo multiple edits. The number of edits, when exceeding a threshold, may require a customized blockchain. The version implies it used until a new version of the document is published for the entire document. This approach permits a blockchain to be created for a particular editing scenario based on a number of edits, parts of the document being edited and the stage of the document (i.e., edited, complete, etc.).

Figure 2:
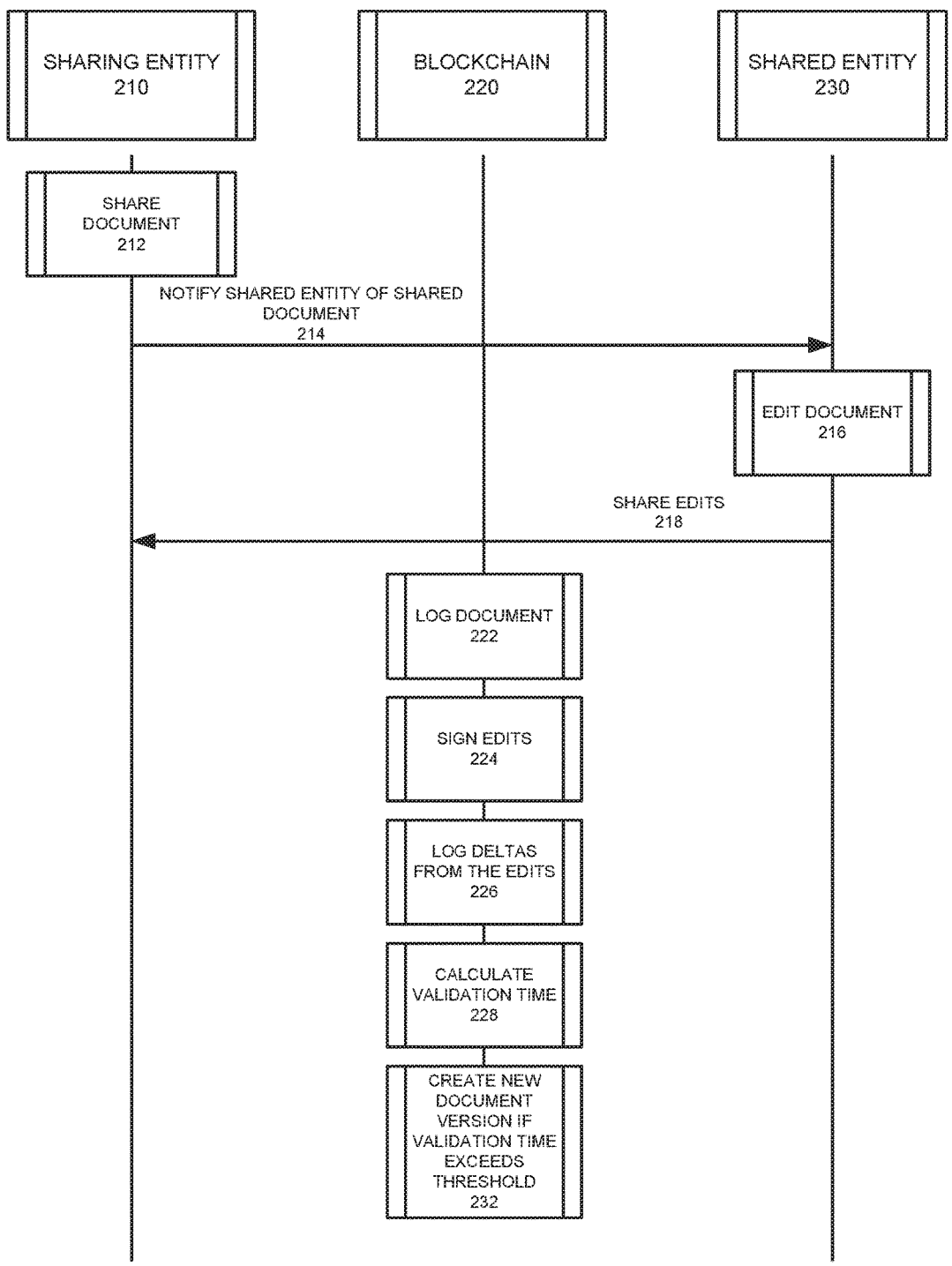
FIG. 2 illustrates a blockchain-based system procedure diagram of receiving and validating transactions to a document according to example embodiments.

FIG. 2 illustrates a blockchain-based system procedure diagram of receiving and validating transactions to a document according to example embodiments. Referring to FIG. 2, the system 200 includes a first entity as a sharing entity or sharing entity computer 210, which may be the author of a document of the party sharing the document with other entities represented by the shared entity or shared entity computer 230. In operation, the document is created/shared 212 and the shared entity 230 may receive access to the document 214. All shared parties can then edit the document in real-time. The document edits 216 are identified and shared with all parties 218. The edits trigger a log operation 222 in the blockchain 220 (which may be located on another computer, on entity 210 or on entity 230) and the edits can be signed 224 and the deltas 226 identified from each edit instance and logged accordingly as blockchain transactions each time there is an edit. When validation occurs, the time/resources needed 228 to perform the validation(s) is/are identified and used to compare to a baseline threshold of efficiency. When efficiency lags based on a recent transaction, a new document may be created based on the threshold measurement determination 232.

Figure 3A:
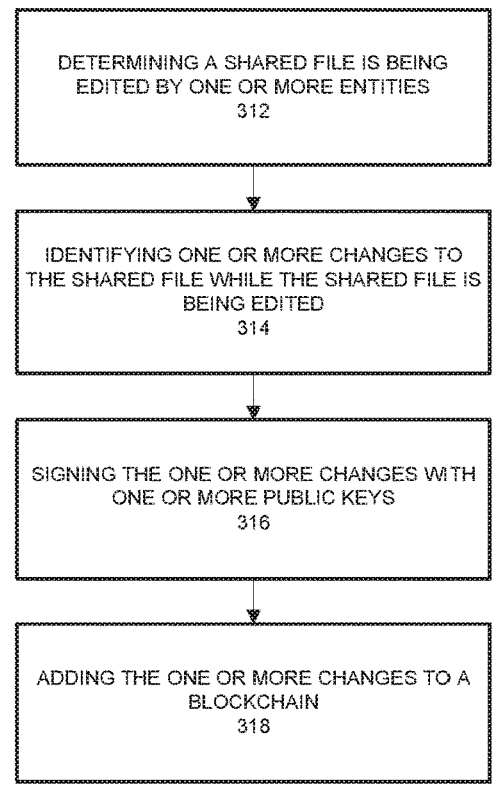
FIG. 3A illustrates a flow diagram of an example method of validating document edit transactions according to example embodiments.

FIG. 3A illustrates a flow diagram of an example method of validating document edit transactions according to example embodiments. Referring to FIG. 3A, the method 300 may include determining a shared file is being edited by one or more entities 312, identifying one or more changes to the shared file while the shared file is being edited 314, signing the one or more changes with one or more public keys 316, and adding the one or more changes to a blockchain 318. The method may also include creating a genesis block of the blockchain based on the shared file, updating one or more privileged portions of the shared file, and storing the one or more changes in the blackchain based on the updates to the privileged portions of the shared file. The method may also provide updating one or more non-privileged portions of the shared file, storing the one or more changes in the blockchain based on the updates to the non-privileged portions of the shared file, determining an amount of time needed to validate the one or more changes stored in the blockchain, comparing the amount of time needed to validate the one or more changes to a threshold amount of time, and determining the amount of time needed exceeds the threshold amount of time. Also, responsive to identifying the threshold amount of time has been exceeded, the method may include creating a new genesis block based on the changes to the shared file and creating a new version of the shared file.

Figure 3B:
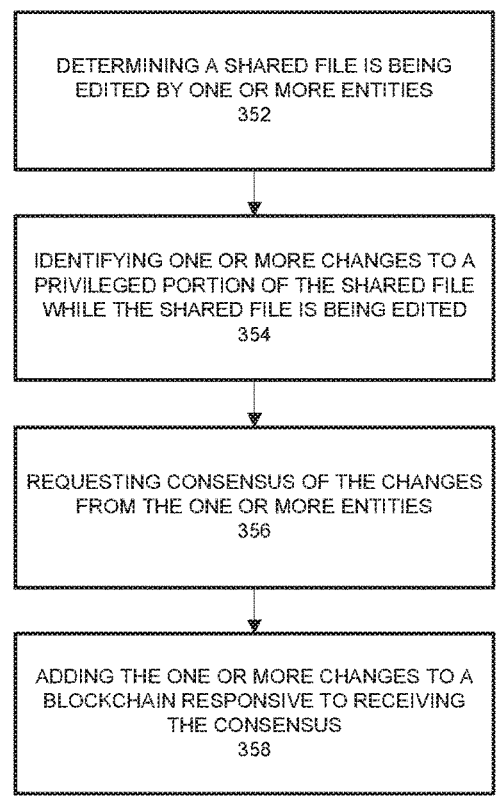
FIG. 3B illustrates a flow diagram of an example method of validating document edit transactions according to example embodiments.

FIG. 3B illustrates a flow diagram of an example method of validating document edit transactions according to example embodiments. Referring to FIG. 3B, the method 350 may include determining a shared file is being edited by one or more entities 352, identifying one or more changes to a privileged portion of the shared file the shared file is being edited 354, requesting consensus of the changes from the one or more entities 356, and adding the one or more changes to a blockchain responsive to receiving the consensus 358. In this example embodiment, when a privileged portion of the document is being edited, the shared users may require a consensus prior to finalizing the changes to prevent unwanted changes and provide traceability to the changes. Each user with access to the privileged portions of a document may receive a notification based on the edits and the consensus model may require two or more members to agree to the changes prior to finalization and validation in the blockchain.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
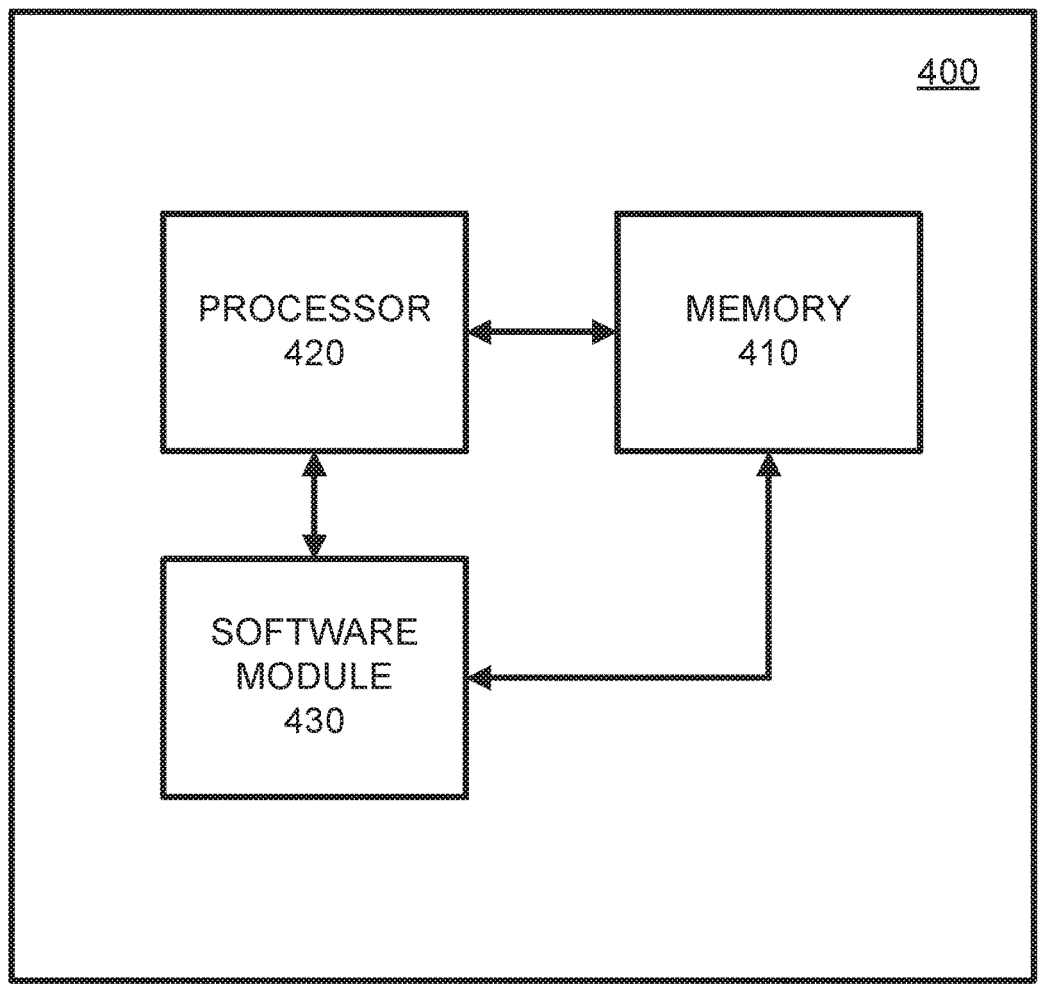
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computer-implemented method, comprising:
   determining, by a computing system, that a shared file is being edited by one or more entities;
   identifying, by the computing system, one or more changes to the shared file while the shared file is being edited;
   signing the one or more changes with one or more public keys, by the computing system;
   adding the one or more changes to a blockchain, by the computing system; and
   determining, by the computing system, an amount of time needed to validate the one or more changes in the blockchain.

2. The computer-implemented method of claim 1, further comprising:
   creating a genesis block of the blockchain based on the shared file, by the computing system.

3. The computer-implemented method of claim 1, further comprising:
   updating one or more privileged portions of the shared file, by the computing system; and
   storing the one or more changes in the blockchain, by the computing system, based on the updates to the privileged portions of the shared file.

4. The computer-implemented method of claim 1, further comprising:
   updating one or more non-privileged portions of the shared file, by the computing system; and
   storing the one or more changes in the blockchain, by the computing system, based on the updates to the non-privileged portions of the shared file.

5. The computer-implemented method of claim 1, further comprising:
   comparing, by the computing system, the amount of time needed to validate the one or more changes to a threshold amount of time; and
   determining, by the computing system, whether the amount of time needed exceeds the threshold amount of time.

6. The computer-implemented method of claim 5, further comprising:
   responsive to identifying the threshold amount of time has been exceeded, creating a new genesis block based on the changes to the shared file, by the computing system; and
   creating a new version of the shared file, by the computing system.

7. An apparatus, comprising:
a processor configured to:
   determine that a shared file is being edited by one or more entities,
   identify one or more changes to the shared file while the shared file is being edited;
   sign the one or more changes with one or more public keys,
   add the one or more changes to a blockchain, and
   determine an amount of time needed to validate the one or more changes in the blockchain.

8. The apparatus of claim 7, wherein the processor is further configured to create a genesis block of the blockchain based on the shared file.

9. The apparatus of claim 7, wherein
   the processor is further configured to update one or more privileged portions of the shared file, and
   the apparatus further comprises a memory configured to store the one or more changes in the blockchain based on the updates to the privileged portions of the shared file.

10. The apparatus of claim 7, wherein the processor is further configured to:
   update one or more non-privileged portions of the shared file; and
   store the one or more changes in the blockchain based on the updates to the non-privileged portions of the shared file.

11. The apparatus of claim 7, wherein the processor is further configured to:
   compare the amount of time needed to validate the one or more changes to a threshold amount of time;
   determine whether the amount of time needed exceeds the threshold amount of time;
   responsive to the threshold amount of time being exceeded, create a new genesis block based on the changes to the shared file; and
   create a new version of the shared file.

12. A non-transitory computer readable storage medium storing instructions that, when executed, cause a processor to perform:
   determining that a shared file is being edited by one or more entities;
   identifying one or more changes to the shared file while the shared file is being edited;
   signing the one or more changes with one or more public keys;
   adding the one or more changes to a blockchain; and
   determining an amount of time needed to validate the one or more changes stored in the blockchain.

13. The non-transitory computer readable storage medium of claim 12, wherein the instructions are further configured to cause the processor to perform;
   creating a genesis block of the blockchain based on the shared file.

14. The non-transitory computer readable storage medium of claim 12, wherein the instructions are further configured to cause the processor to perform:
   updating one or more privileged portions of the shared file; and
   storing the one or more changes in the blockchain based on the updates to the privileged portions of the shared file.

15. The non-transitory computer readable storage medium of claim 12, wherein the instructions are further configured to cause the processor to perform:
   updating one or more non-privileged portions of the shared file; and
   storing the one or more changes in the blockchain based on the updates to the non-privileged portions of the shared file.

16. The non-transitory computer readable storage medium of claim 12, wherein the instructions are further configured to cause the processor to perform:
   comparing the amount of time needed to validate the one or more changes to a threshold amount of time; and
   determining whether the amount of time needed exceeds the threshold amount of time.

17. The non-transitory computer readable storage medium of claim 16, wherein the instructions are further configured to cause the processor to perform:
   responsive to identifying the threshold amount of time has been exceeded, creating a new genesis block based on the changes to the shared file; and
   creating a new version of the shared file.

* * * * *